United States Patent Office 2,967,101
Patented Jan. 3, 1961

2,967,101

DEFOLIANT COMPOSITIONS

Philip C. Hamm, Webster Groves, and Norman J. Lewis, Kirkwood, Mo., assignors to Monsanto Chemical Company, St. Louis, Mo., a corporation of Delaware No Drawing. Filed Jan. 20, 1954, Ser. No. 405,238

6 Claims. (Cl. 71—2.6)

This invention relates to methods of removing leaves from living plants without damaging growing crops. More specifically, the invention relates to the use of certain chemicals to defoliate plants.

In harvesting many agricultural crops by mechanical equipment, the leaves frequently interfere with the proper operation of the machine. Also the quality of crops may be materially affected, for example by discoloration in the case of cotton and by the presence of undesirable impurities as in the case of soybeans and other seed crops.

The defoliation phenomenon is quite distinguishable from herbicidal effects. When a plant is destroyed completely by herbicides the leaves do not generally fall, but dry firmly attached to the plant. Furthermore the growth and development of the seed crops ceases immediately upon the death of the plant. However if the plant is treated with certain substances, the leaves fall without destroying the entire plant. This phenomenon is due to the effect of the chemical upon the layers of abscission cells in the petioles. This loss of foliage is similar to that which occurs in deciduous plants when the plants become dormant for the winter season.

The artificially defoliated plant does not become dormant immediately and the seed crops continue to develop or ripen. The plant without leaves is capable of being harvested much more efficiently than is otherwise possible. Cotton crops treated in this manner can be picked either by hand or by mechanical equipment to recover a larger yield of better quality cotton free of leaves and stems. Similarly seed crops, such as soybeans, can be picked with a larger yield, due to smaller droppage loss, and with less impurities than is otherwise possible. The removal of plant foliage hastens the ripening of the seed crops and permits an acceleration of the harvesting thereby making the land available for winter cover crops at an earlier date.

It has been discovered that quite efficient defoliation is obtained by treating the crops with aromatic substituted thioureas of the following formula

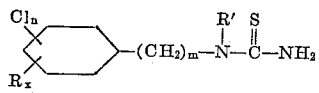

wherein R is a radical selected from the group consisting of hydrogen and alkyl radicals having up to three (3) carbon atoms, R' is a radical selected from the group consisting of hydrogen and alkyl radicals having up to three (3) carbon atoms, $n$ is an integer from zero (0) to three (3), $x$ is an integer from zero (0) to two (2), and $m$ is an integer from zero (0) to three (3).

Suitable compounds for the practice of this invention are:

1-(p-tolyl)-2-thiourea
1-(2,5-dichlorophenyl)-thiourea
1-(phenethyl)-thiourea
1-(p-chlorophenyl)-thiourea
1-(2,4-dichlorophenyl)-thiourea
1-(m-chlorophenyl)-thiourea
1-benzyl-thiourea
1-(2,4-dichloro-5-methyl phenyl)-2-thiourea
1-(o-chlorophenyl)-2-thiourea
1-(o-ethyl phenyl)-thiourea
1-phenyl-1-ethyl-2-thiourea
1-p-chlorophenyl-1-ethyl-2-thiourea The compositions are usually formulated for use by adding them to diluents or carriers, which may be either solid or liquid. The resulting compositions may be true solutions or liquid dispersions. The liquid dispersions may be either water base or oil base or may be mixtures of oil and water suitably emulsified to suspend the active ingredient effectively therein. The formulations may contain from 0.01 to 10 percent by weight of the active ingredient and should be applied in such an amount to effect defoliation without complete destruction of the plant. Generally the application of from 5 to 50 lbs. of active ingredient per acre will be useful in accomplishing the desired result.

As hereinbefore stated, the compositions of this invention can be prepared in numerous ways. For example, the aqueous dispersions containing from about 0.01 percent to about 10 percent by weight, or higher, of the active ingredients and from about 0.1 percent to about 5 percent by weight of a dispersing or wetting agent to be prepared by dispersing the active ingredients in an aqueous solution containing the dispersing or wetting agent.

Aqueous colloidal dispersions or emulsions can also be prepared by dissolving the active ingredients in the smallest amount of a water-immiscible organic solvent which will dissolve the quantity of active ingredient to be used. Then, this solution is colloidally dispersed in water by mechanical means, as with a homogenizer, or by means of a suitable emulsifying agent.

Still another type of aqueous spray formulation can be employed. The active ingredients are first dissolved in the smallest amount of a water-miscible organic solvent which will dissolve the quantity of active ingredient to be used. Then, this solution is added to water or an aqueous solution of a wetting agent to obtain the desired dilution.

In addition to the organic solutions and the aqueous compositions above described, the aromatic substituted thioureas can be employed as defoliants in dust compositions, that are thoroughly admixed with a finely divided pulverulent solid, such as clay, talc, diatomaceous earths and precipitated chalk. Wetting agents can be added to these dusts to increase their dispersibility in water and their effectiveness in contacting plant leaves.

An oil emulsion of the active ingredient can also be prepared. These oil emulsions will also be found to be exceedingly useful as defoliants. To prepare these oil emulsions, the active ingredient is dispersed in a hydrocarbon oil with a suitable emulsifying agent. The hydrocarbon oils which are preferred for such formulations are the liquid hydrocarbon oils containing 10 to 20 carbon atoms. Specific hydrocarbon oils are the kerosenes, fuel oils, diesel oils, and other petroleum mixtures.

All of these compositions have the common physical property of being in a flowable form so that they can be applied with spraying and dusting equipment. Accordingly, they all consist of the active ingredient incorporated in a fluent carrier. The preferred compositions of this invention are those containing the active ingredient, a wetting agent and a fluent carrier.

Such emulsifying and dispersing agents, hereafter referred to as wetting agents as, for example, those typified by the following general classifications: sodium and potassium salts of fatty acids known as soft and hard soaps, salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; fatty acid esters of polyhydric alcohols, water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan monolaurates, palmitate, stearate, and oleate; condensation products of ethylene oxide with fatty acids, abietic acid, alkyl phenols and mercaptans; and others may be advantageously employed in preparing the compositions of this invention. These dispersing and wetting agents are sold under numerous trade names and may either be pure compounds, mixtures of compounds of the same general group or they may be mixtures of compounds of different classes.

The following examples illustrate the defoliant properties of the described compositions.

*Example 1*

Bush beans grown in greenhouse flats were effectively defoliated by the use of approximately 20 lbs. per acre of each of the following compounds:

1-(phenethyl)-thiourea
1-(p-chlorophenyl)-thiourea
1-(2,4-dichlorophenyl)-thiourea
1-benzyl-thiourea
1-(2,4-dichloro-5-methyl phenyl)-2-thiourea
1-(o-chlorophenyl)-2-thiourea
1-phenyl-1-ethyl-2-thiourea
1-p-chlorophenyl-1-ethyl-2-thiourea Some of these and other compounds were found to be effective at lower concentrations, for example at 10 to 15 lbs. per acre. Substantially complete defoliation was observed at low levels of application with respect to 1-(p-chlorophenyl)-thiourea, and 1-(p-tolyl)-2-thiourea.

*Example 2*

Experiments on defoliation of soybeans established the effectiveness of this class of compounds. By the application of the following defoliants at the rate of approximately 40 lbs. per acre 100 percent defoliation was observed:

1-(phenethyl)-thiourea
1-(p-chlorophenyl)-thiourea

*Example 3*

Cotton was also completely defoliated by the use of each of the following compounds using a 40 lbs. per acre application:

1-(phenethyl)-thiourea
1-(p-chlorophenyl)-thiourea

*Example 4*

Both cotton and soybeans in greenhouse flats were treated with about 30 lbs. per acre of the aryl substituted thioureas. A 100 percent defoliation of both crops was obtained by the use of 1-(2,5-dichlorophenyl)-thiourea.

What is claimed is:

1. A plant defoliant composition comprising from 0.01 to 10 percent by weight of a compound having the formula:

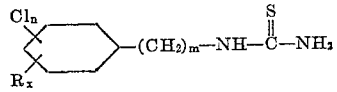

wherein $m$ is an integer from one (1) to two (2), $n$ is an integer from zero (0) to three (3), $x$ is an integer from zero (0) to two (2) and R is an alkyl radical having up to three (3) carbon atoms; from 0.1 to 5 percent of a wetting agent; and the balance being a fluid carrier.

2. The composition defined by claim 1 wherein the essential active ingredient is 1-benzyl-2-thiourea.

3. A method of defoliating plants which comprises contacting plant surfaces with from 5 to 50 pounds per acre of a compound having the structure:

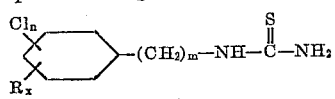

wherein $m$ is an integer from one (1) to two (2), $n$ is an integer from zero (0) to three (3), $x$ is an integer from zero (0) to two (2) and R is an alkyl radical having up to three (3) carbon atoms.

4. A plant defoliant composition comprising from 0.01 to 10% by weight of 1-(phenethyl)-thiourea, from 0.1 to 5% of a wetting agent, and the balance being a fluid carrier.

5. The method of defoliating plants which comprises contacting plant surfaces with 1-(phenethyl)-thiourea, said compound being used in an amount sufficient to effect defoliation.

6. A method of defoliating plants which comprises contacting the plant surfaces with 1-benzyl-2-thiourea, said compound being used in an amount sufficient to effect defoliation.

References Cited in the file of this patent

UNITED STATES PATENTS

| | | |
|---|---|---|
| 1,748,580 | Minaeff | Feb. 25, 1930 |
| 2,412,510 | Jones | Dec. 10, 1946 |

OTHER REFERENCES

"Botanical Gazette," vol. 107 (1946), pp. 475 to 507 (pp. 479, 480 and 505 particulary relied on).